Figure 1:
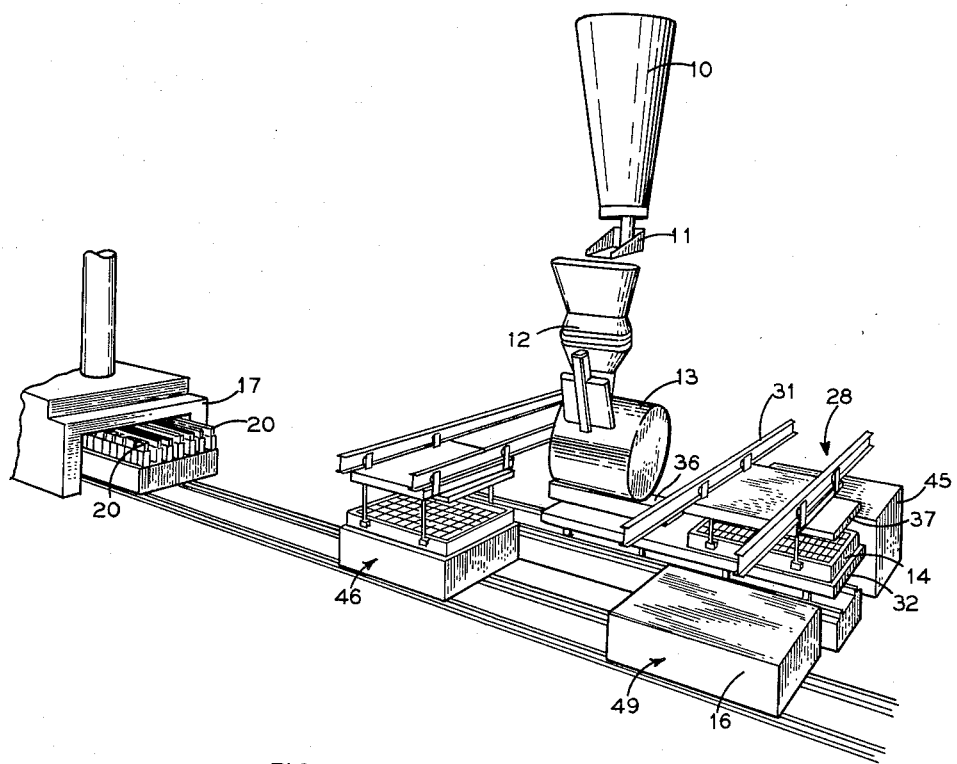

April 20, 1965  E. J. DICKSON ETAL  3,178,791
APPARATUS FOR MOLDING REFRACTORY SHAPES
Filed Jan. 23, 1962  2 Sheets-Sheet 1

INVENTORS
Edwin J. Dickson
Arthur M. Waldron, Jr.
Benjamin S. Ziccarelli
Carl H. Swanson
BY
ATTORNEY April 20, 1965   E. J. DICKSON ETAL   3,178,791
APPARATUS FOR MOLDING REFRACTORY SHAPES
Filed Jan. 23, 1962   2 Sheets-Sheet 2

INVENTORS
Edwin J. Dickson
Arthur M. Waldron, Jr.
Benjamin S. Ziccarelli
Carl H. Swanson
BY
ATTORNEY

United States Patent Office 3,178,791
Patented Apr. 20, 1965

3,178,791
APPARATUS FOR MOLDING REFRACTORY SHAPES
Edwin J. Dickson, Arthur M. Waldron, Jr., and Benjamin S. Ziccarelli, Augusta, Ga., and Carl H. Swanson, North Augusta, S.C., assignors to The Babcock & Wilcox Company, New York, N.Y., a corporation of New Jersey
Filed Jan. 23, 1962, Ser. No. 168,101
9 Claims. (Cl. 25—2)

The present invention relates to apparatus for molding ceramic refractory materials, and more particularly to the molding of ceramic refractory shapes on a kiln car with a minimum of shape handling.

In the manufacture of ceramic refractory articles a raw mix is usually molded to the desired shape, removed from the mold and fired to the temperature required for the final production. Depending upon the particular product being manufactured, a greater or lesser amount of handling will be involved, where such handling may be expensive and ordinarily contributes to product breakage before firing and rejection of some of the finished products.

The desirability of reducing the amount of handling in the production of ceramic articles is well known in the art, and is particularly desirable in the mass production of fragile unburned ceramic articles, such as for example, insulating fire bricks.

In the present invention the breakage and loss of product due to handling is drastically reduced by mechanizing the molding and handling procedure in, for example, the mass production of ceramic insulating fire bricks. This is accomplished in the present invention by constructing a mold having a multiplicity of mold cavities therein, where the mold dimensions are such as to substantially match the dimensions of the surface area of a kiln car. In the invention a batch of raw materials is prepared and delivered to a molding station where the raw materials are distributed uniformily to each of the cavities of the mold, thus forming a multiplicity of brick shapes. The molding zone is so constructed that the mold, with the bricks shapes therein, may then be transported directly to the kiln car. With the mold in the proper position relative to the kiln car, the bricks are deposited on the car, the mold withdrawn and thereafter transported to a washing and cleaning zone where it is prepared for the next molding cycle. The bricks deposited on the kiln car are placed in proper relationship to each other and to the kiln car in discharging from the mold so that the bricks may then be moved through the burning zone, where the bricks are burned at the proper temperatures to produce the finished product.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a preferred embodiment of the invention has been illustrated and described.

Figure 4:
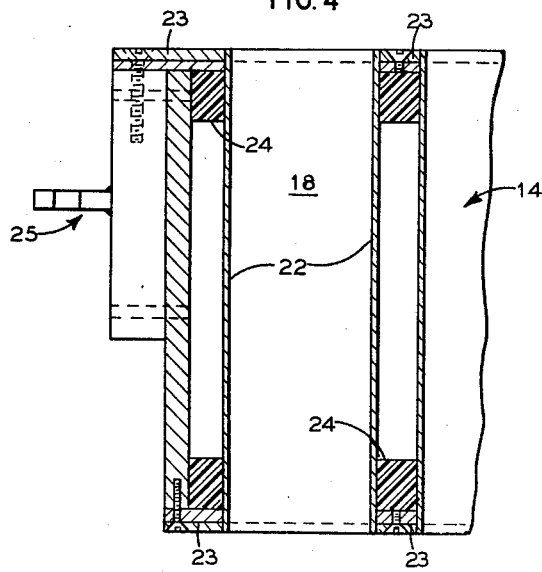
Figure 2:
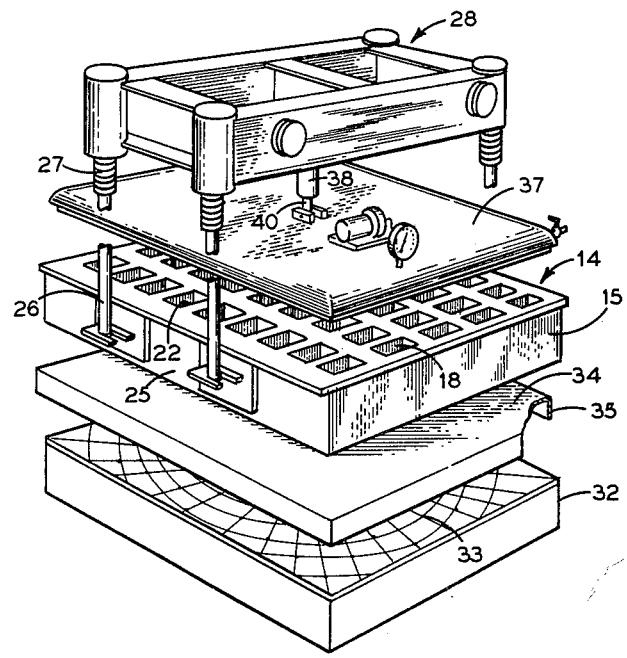
Figure 3:
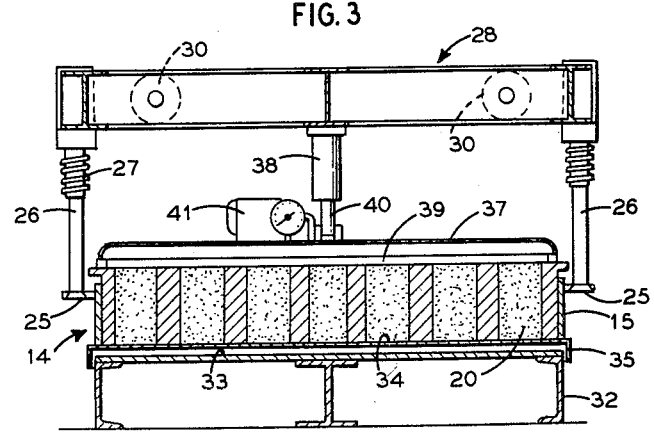

Of the drawings:
FIGURE 1 is a somewhat schematic perspective view of the apparatus of the present invention;
FIGURE 2 is an exploded perspective view, to a larger scale, of the molding zone shown in FIGURE 1 of the drawings;
FIGURE 3 is a vertical section taken through the mold, at the molding zone shown in FIGURES 1 and 2; and,
FIGURE 4 is an enlarged cross-section of a portion of the mold shown in FIGURES 1 to 3, inclusive.

While the present invention is not limited thereto, it is illustrated as applied in the manufacture of insulating fire bricks. The fire bricks may have a composition such as that set forth in U.S. Patent 2,318,574. In the manufacture of the insulating fire bricks of the patented composition, the raw mix is such that the wet material introduced into the mold will form a "slick" against the confining wall of the mold so that the brick may be removed by gravity effects, without the application of external ejecting forces. Depending on the composition of the raw mix, the "slick" will allow gravity removal from the mold in a few minutes, 5 minutes for example, after filling the mold. The "slick" formation is primarily due to the set of the gypsum in the wet mix.

As shown in FIGURE 1 the dry ingredients for the manufacture of the insulating fire bricks are delivered to a hopper 10 from suitable weighing and conveying means (not shown). From the hopper 10 the raw material mix is withdrawn by a feeder trough 11 for batch weighing in a weighing device 12. When the proper quantity of dry raw materials has been obtained the flow of materials from the hopper 10 is discontinued, and the batch is discharged by gravity into a mixer 13. As shown, the mixer 13 is of the enclosed non-rotating drum type with rotating blades where the proper amount of water is mixed with a dry raw material to produce a batch sufficient to fill all of the cavities in the mold 14 hereinafter described, without a substantial excess of such raw materials.

The mold 14 is shown in each of the drawings 1 to 4 and consists of an exterior frame 15 which is assembled with cross-sectional dimensions substantially equal to the surface area of a kiln car 16 on which the molded bricks are deposited for passage to and through a tunnel kiln 17.

The frame 15 of the mold supports and encloses a mold structure providing a multiplicity of cavities 18, each of which is formed to the desired dimensions to produce a finished product. For example, in the manufacture of standard and special brick sizes, the cavities 18 may be 10″ x 5¼″ x 3″ with the 10″ dimension upright. The cavities are horizontally spaced so that when the molded bricks 20 are deposited on the kiln car 16 they will be in a spaced relationship desirable for efficient burning of the bricks in the kiln 17.

As shown particularly in FIGURE 4, each of the mold cavities 18 is constructed with open upper and lower ends. The side walls 22 of the cavity are formed of brass plates which are attached at their upper and lower ends by steel strips 23 providing the proper spacing between adjacent cavities. The brass plates 22 are held to the steel strips 23 and spaced from each other by epoxy resin material 24 positioned adjacent the upper and lower ends of the plates 22.

The epoxy resin is plastic as initially installed, but will air harden to form a rigid connection and seal between the upper and lower spacing strips 23 and the walls of the mold cavity, so as to hold the brass plates in their preferred position.

The mold frame 15 is supported by brackets 25 formed on opposite sides thereof which in turn are attached to depending arms 26 which are threaded at their upper end portions 27 for engagement with correspondingly threaded rotatable sleeves in the overhead support structure 28 to permit vertical movement of the mold 14 relative to the over-head support structure 28. The structure 28 is mounted on wheels 30 rolling on transversely positioned rails 31 so that the mold 14 and the structure 28 may be moved as a unit from the molding zone position to a brick discharge position, where the bricks 20 are deposited on a kiln car 16.

Before the raw mix from the drum 13 is delivered to the mold 14, the mold is positioned on a molding table 32. The molding table has an upper plate surface 33 which is grooved and perforated as shown in FIGURE 2. Above the mold support 32 is positioned a cap member 34 having depending peripheral flanges 35. The cap member is dimensioned so that the flanges on the periphery thereof will telescope over the upper end portion of the mold support table 32 with the cap 34 resting on the support 32 and the mold 14 resting on the cap. The assembly is then ready to receive the wet raw materials prepared in the mixer 13.

When the mold 14 is positioned to receive the raw material the batch of mixture is discharged from the drum 13 to the mold. The mold is provided with an upper distributing plate or blade 36 which is mounted for horizontal movement across the surface of the mold 14. The distributing blade is illustrated in FIG. 1 and in operation moves horizontally across the upper face of the mold 14 to fill each of the cavities 18 with the wet mix. Any excess of mix will, of course, be pushed off the surface of the mold 14, to be discarded. In the usual procedure of operation the quantity of wet mix is so selected as to provide a minimum of excess while providing sufficient mix to fill all of the mold cavities.

With the mix distributed to the cavities of the mold and the excess mix removed by the blade, the blade is retracted and a hood 37 is placed on the surface of the mold 14 with the edges of the hood in sealing relationship to the upper peripheral edge of the mold (see FIG. 3). The hood may be moved in a vertical direction to engage and disengage the mold edges as shown in FIG. 2 by means of a hydraulic cylinder 38 having a piston therein and a rod 40 attached substantially in the center of the hood. With the hood in sealing relationship to the upper edges of the mold a vacuum pump 41 is started to evacuate the air from the space 39 between the hood and the upper surface of the molded bricks and the mold.

When a desired vacuum has been produced, the mold 14 is lifted in a vertical direction. The height of mold movement is less than the vertical dimension of the depending flange 35 of the cap 34 relative to the mold support 32. The cap adheres to the lower surface of the mold and the bricks therein, with the grooves and perforations in the surface 33 of the table top facilitating separation of the cap 34 and the table surface. The mold 14 with the hood 37 thereon is then moved transversely on the rails 31 to cause the mold with the bricks therein to slide along the upper surface of the cap 34 and to thus disengage the bricks from the cap surface. This transverse or sliding movement is necessary to avoid tearing of the lower surfaces of the bricks in the mold 14 during disengagement from the surface of the cap 34. The vacuum maintained beneath the hood 37 at the upper surface of the bricks will retain them in the mold, and the assembly with the bricks therein may be delivered to a location above the kiln car 16.

When the mold is properly positioned directly above the kiln car 16, the mold 14 lower surface is within a few inches of the surface of the kiln car. Ordinarily previously burned refractory bricks are positioned on the surface of the kiln car to provide a level surface for the newly molded bricks to rest upon, and to permit suitable circulation of hot gases around the brick during the burning process in the kiln 17. Such burned bricks are known as kiln furniture. Thereafter the vacuum beneath the hood is released under controlled conditions, and the bricks will gradually discharge from the mold by the force of gravity acting thereon. As the bricks leave the mold cavities 18, the mold is gradually lifted until the lower surface of the mold 14 is above the bricks resting on the kiln furniture, and the mold may thereafter be returned to repeat the brick molding operation.

After the removal of the bricks, the mold is moved on the rails 31 to the opposite side of the molding support table 32 and enters a cleaning zone, indicated at 45, where the mold 14 is washed and brushed to remove any residue of raw mix that may be retained in the mold cavities. The washing zone may consist of a row of brushes which are rotatable and movable in a vertical direction. The brushes may be arranged with corresponding rows of water jets to wash and clean one row of mold cavities 18 at a time, with either the mold being incrementally moved, or the brushes and water jets may be moved transversely in steps to continue the brushing and washing operation on successive rows of mold cavities. The washing liquid is preferably water, but other fluids can be used. Additives may be used in the water if found desirable.

After the mold has been thoroughly washed to remove the residue of mix remaining from the preceding molding cycle, the mold is returned to the molding support table 32 location, the mold walls are oiled to eliminate sticking of mix to the walls of the cavities 18, and the apparatus is then ready to repeat the molding cycle.

After a layer of bricks 20 has been deposited on a kiln car 16 at a first molding station 49, as hereinbefore described the car may be moved to a spaced position on the opposite side, for example, of the mixing drum 13 and a second layer of insulating bricks may be depoisted on the top of the first layer of bricks by a similar second molding station 46 which may be served from the same mixing drum 13 as used in the first molding station. If desired the bricks molded at the second station 46 may be formed with their major dimension laying in a horizontal plane. As an alternate, other shapes may be formed and/or the bricks deposited with their major dimension parallel to the direction of car movement or normal thereto. Whether 1 or 2 layers of bricks are deposited on the kiln car 16, the car with the bricks thereon is thereafter passed directly into the kiln 17 for proper heat treatment or burning of the bricks to produce the finished article.

It will be noted the present invention provides a system for the production of molded ceramic refractory materials where the material is molded and deposited on a kiln car without the usual handling necessary for the production of such articles. While the apparatus disclosed is particularly adapted for the production of insulating fire bricks the process of the invention can be adapted for the molding of other refractory articles with an advantageous reduction in the handling of the molded shapes, and a consequent reduction both in shape breakage before firing and in rejection of the finished product.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

The claims are:

1. Apparatus for molding ceramic refractory bricks which comprises in combination, means for preparing a batch of wet ceramic refractory mix forming a slick upon partial setting, a brick mold having a multiplicity of open ended cavities therein, a molding table substantially coextensive in surface with the lower surface of said mold for supporting and closing the lower open end of said mold, means for distributing said batch of mix to each of the cavities in said mold, a kiln car positioned at one side of said molding table, means for maintaining said mix within said mold cavities while moving said mold from said molding table, transfer means for transferring said mold and the bricks in the open ended cavities of the mold to said kiln car, and means for gravitationally depositing the molded bricks from said mold cavities onto said kiln car after said mix has partially set.

2. Apparatus for molding ceramic refractory material which comprises in combination, means for preparing a batch of wet ceramic refractory mix containing gypsum, a mold having a multiplicity of open ended cavities therein, a molding table substantially coextensive with and supporting said mold, means for transporting said batch of wet mix to said mold, a spreader for distributing said mix to each of the cavities in said mold, means for maintaining said mix within said mold cavities while moving said mold from said molding table, a kiln car positioned to one side of said molding table, transfer means for transferring said mold and the refractory shapes therein to said kiln car, and means for gravitationally depositing the molded shapes on said kiln car after partial set of said mix.

3. Apparatus for molding insulating fire brick which comprises in combination, means for preparing a batch of wet brick mix to provide a slick against the mold so that upon partial setting the brick can be gravitationally removed from the mold, a brick mold having a multiplicity of open ended cavities therein, a molding table substantially coextensive with said mold, a flanged cap on the top of said table with said mold resting on said cap on said molding table to form a molding station, means for transporting said batch of mix to said mold, a spreader for distributing said mix to each of the cavities in said mold while at said molding station, means for maintaining said bricks within said mold cavities while transversely moving said mold and slipping the bottom of said mold from said cap, a kiln car positioned to one side of said molding table, transfer means for transferring said mold and the bricks therein from said molding station to said kiln car, and means for depositing the molded bricks on said kiln car.

4. Apparatus for molding insulating fire brick which comprises in combination, means for preparing a batch of wet brick mix containing gypsum, a brick mold having a multiplicity of open ended cavities therein, a molding table substantially for supporting said mold, means for transporting said batch of wet mix to said mold, a spreader for distributing said mix to each of the cavities in said mold, a kiln car positioned to one side of said molding table, means for maintaining said bricks within said mold cavities while disengaging said mold and molding table including a vacuum system at the top of said mold, transfer means for lifting and transferring said mold and the bricks therein to said kiln car, and means for depositing the molded bricks on said kiln car by the force of gravity by breaking the vacuum at the top of said mold.

5. Apparatus for molding insulating fire bricks comprising, a brick mold of substantially uniform depth having a plurality of open ended cavities therein, a mold support table of substantially coextensive area with the lower open ends of said mold cavities, a kiln car located on one side of said table, means for filling said mold cavities with a wet mix of brick ingredients while the mold is on said mold support table, said brick ingredients being so composed that a slick will be formed against the wall of the mold upon partial setting of the brick, means for moving said brick mold between said mold support table and said kiln car, hood means arranged to sealingly engage the upper surface of said mold when the mold is positioned on said mold support table, means for forming a vacuum between said hood and mold to maintain the mix in the mold cavities during transfer from said mold support table to said kiln car, and means for gravitationally depositing said molded bricks directly from said mold cavities on to said kiln car.

6. Apparatus for molding insulating fire bricks comprising, an upright open ended brick mold, a mold support table, mold washing means located to one side of said mold support table, a kiln car located on the opposite side of said table, means for filling said mold with a wet mix of the brick ingredients while said mold is positioned on said molding table, said brick ingredients being so composed that a slick will be formed against the wall of the mold upon partial setting of the brick, means for moving said brick mold in a transverse direction between the locations of said mold support table, said kiln car and said washing means, hood means arranged to sealingly engage the upper surface of said mold when the mold is positioned on said mold support table and to disengage the upper surface of the mold after the mold is positioned on said kiln car, means for forming a vacuum between said hood and mold to maintain the mix in the mold during transfer from said mold support table to said kiln car, and means for breaking said vacuum to gravitationally discharge the molded bricks from said mold directly on said kiln car.

7. Apparatus for molding insulating fire bricks comprising, an open ended brick mold, a mold support table having a perforate upper surface, a cap having flanged edges located on the top of said table to contact said mold when in molding position, mold washing means located to one side of said mold support table, a kiln car located on the opposite side of said table, means for filling said mold with a wet mix of the brick ingredients, said brick ingredients being so composed that a slick will be formed against the wall of the mold upon partial setting of the brick, means for moving said brick mold in a vertical direction, means for moving said mold in a transverse direction between the locations of said mold support table, said kiln car and said washing means, hood means arranged to sealingly engage the supper surface of said mold when the mold is positioned on said mold support table, means for forming a vacuum between said hood and mold to maintain the mix in the mold during transfer from said mold support table to said kiln car, means for disengaging said hood means from the upper surface of the mold when the mold is positioned on said kiln car, and for gravitationally depositing said molded bricks on said kiln car.

8. Apparatus for molding insulating fire bricks comprising, an open ended brick mold, a mold support table having a perforate upper surface, a cap having flanged edges located on the top of said table with a surface substantially coextensive with said mold to contact said mold when in molding position, mold washing means located to one side of said mold support table, a kiln car located on the opposite side of said table, means for filling said mold with a wet mix of the brick ingredients, said brick ingredients being so composed that a slick will be formed against the wall of the mold upon partial setting of the brick, means for moving said brick mold in a vertical direction, means for moving said mold in a transverse direction between the locations of said mold support table, said kiln car and said washing means, hood means arranged to sealingly engage the upper surface of said mold when the mold is positioned on said mold support table, means for forming a vacuum between said hood and mold to maintain the mix in the mold during transfer from said mold support table to said kiln car, means for disengaging said hood means from the upper surface of the mold when the mold is positioned on said kiln car, and means including gravitational removal of bricks from said mold for depositing said molded bricks on said kiln car.

9. Apparatus for molding insulating fire bricks comprising an open ended brick mold, a mold support table having a perforated upper surface, a cap having flanged edges located on the top of said table to contact said mold when in molding position, mold washing means located to one side of said mold support table, a kiln car located on the opposite side of said table, means for filling said mold with a wet mix of the brick ingredients, said brick ingredients being so composed that a slick will be formed against the wall of the mold upon partial setting of the brick, means for moving said brick mold in a vertical direction while maintaining said cap flange in contact with said mold support table and separating said cap from said mold by a sliding movement therebetween, means for moving said mold in a transverse direction between the locations of said mold support table, said kiln car and said washing means, hood means arranged to sealingly engage the upper surface of said mold when the mold is positioned on said mold support table and to disengage the upper surface of the mold when the mold is positioned on said kiln car, and means for forming a vacuum between said hood and mold to maintain the mix in the mold during transfer from said mold support table to said kiln car.

References Cited by the Examiner

UNITED STATES PATENTS

| | | | |
|---|---|---|---|
| 1,155,311 | 9/15 | Herrmann | 25—1 |
| 1,304,185 | 5/19 | Jordan | 25—1 |
| 1,425,449 | 8/22 | Cary | 25—2 |
| 1,472,646 | 10/23 | Glenn | 25—120 |
| 1,655,878 | 1/28 | Reif | 25—10 |
| 1,959,512 | 5/34 | Wall et al. | 25—1 |
| 2,101,677 | 12/37 | Hagemeyer. | |
| 2,175,715 | 10/39 | Denning | 25—120 |
| 2,288,403 | 6/42 | Jurgenson | 25—41.1 |
| 2,638,654 | 5/53 | Jordan | 25—120 |
| 2,655,710 | 10/53 | Roensch et al. | |
| 2,708,783 | 5/55 | Ripley | 25—155 |
| 2,835,016 | 5/58 | Dixon. | |
| 2,908,062 | 10/59 | Schob | 25—103 |

ROBERT F. WHITE, *Primary Examiner.*

MICHAEL V. BRINDISI, *Examiner.*